(12) United States Patent
Ubukata et al.

(10) Patent No.: US 6,371,183 B1
(45) Date of Patent: Apr. 16, 2002

(54) REDUCED WEIGHT PNEUMATIC TIRES

(75) Inventors: Toru Ubukata, Kodaira; Kazuyuki Hamamura, Tokorozawa, both of (JP)

(73) Assignee: Bridgestone Corporation, Tokyo (JP)

( * ) Notice: Subject to any disclaimer, the term of this patent is extended or adjusted under 35 U.S.C. 154(b) by 40 days.

(21) Appl. No.: 09/657,637

(22) Filed: Sep. 7, 2000

Related U.S. Application Data

(62) Division of application No. 09/003,590, filed on Jan. 6, 1998, now Pat. No. 6,260,596.

(30) Foreign Application Priority Data

Jan. 24, 1997 (JP) ................................ 9-11490

(51) Int. Cl.⁷ ............................. B60C 9/18; B60C 9/20
(52) U.S. Cl. ..................... 152/534; 152/526; 152/527
(58) Field of Search ................ 152/534, 535, 152/526, 527

(56) References Cited

U.S. PATENT DOCUMENTS

| | | |
|---|---|---|
| 2,943,663 A | 7/1960 | Antonson |
| 3,195,602 A | 7/1965 | Keefe, Jr. |
| 3,233,649 A | 2/1966 | Jolivet et al. |
| 3,515,197 A | 6/1970 | Boileau |
| 3,616,832 A | 11/1971 | Shima et al. |
| 4,016,916 A | 4/1977 | Ravagnani |
| 5,109,906 A | 5/1992 | Giancola |

FOREIGN PATENT DOCUMENTS

FR 1260466 3/1961

OTHER PUBLICATIONS

Mechanics of Pneumatic Tires, ed. Samuel Clark: US Department of Transportation, Aug. 1981, p. 62.

Primary Examiner—Adrienne C. Johnstone
(74) Attorney, Agent, or Firm—Sughrue Mion, PLLC

(57) ABSTRACT

A pneumatic tire comprises at least one carcass ply of textile cords and a belt comprised of two cross belt layers containing textile cords arranged at a cord inclination angle of 10–45° with respect to the equatorial plane, in which a difference of cord inclination angle between the two cross belt layers with respect to the equatorial plane of the tire is within a range of 5–35° in the widthwise direction, and is mounted onto at least either left-side or right-side front wheel of a four-wheeled vehicle.

7 Claims, 4 Drawing Sheets

FIG_1

FIG_4
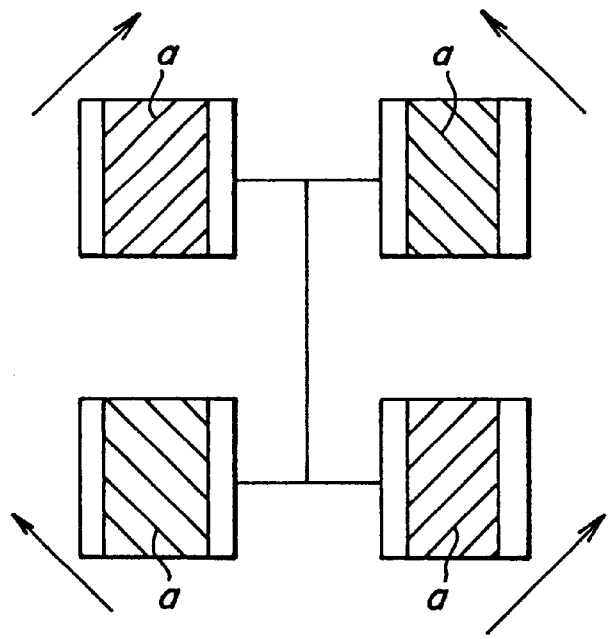
FIG_5
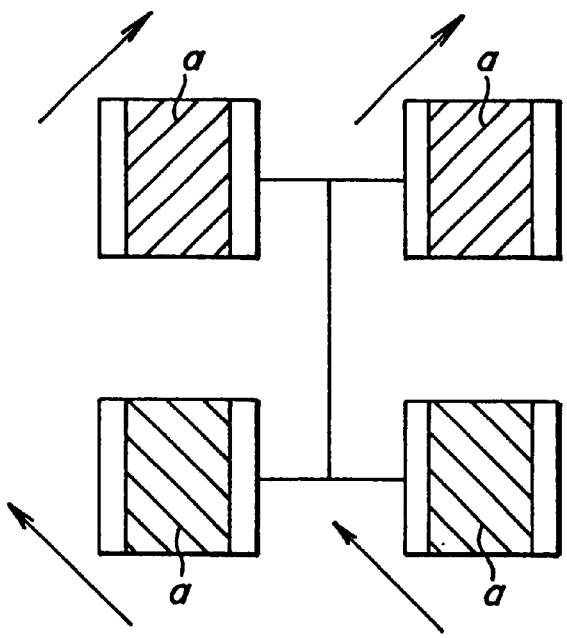

REDUCED WEIGHT PNEUMATIC TIRES

This is a divisional of application Ser. No. 09/003,590 filed Jan. 6, 1998, now U.S. Pat. No. 6,260,596 the disclosure of which is incorporated herein by reference.

BACKGROUND OF THE INVENTION

1. Field of the Invention

This invention relates to a pneumatic tire usable for high-performance type passenger car and racing car and a method of mounting the same on a vehicle.

2. Description of Related Art

In the conventional pneumatic tire used in the high-performance type passenger car, it has generally been attempted to improve the high-speed durability and steering stability by adopting high-rigidity and high-strength steel cords (tensile modulus: about 15000–20000 kgf/mm$^2$) in a belt layer to thereby enhance the rigidity of the belt layer.

However, steel cord is very heavy in weight per unit length as compared with the other tire cords (rayon cord, nylon cord, polyester cord and the like), so that the tire weight is undesirably increased by adopting the steel cords in the belt layer. The increase of the tire weight is not related to fuel consumption.

SUMMARY OF THE INVENTION

It is, therefore, an object of the invention to provide a pneumatic tire capable of establishing the high-speed durability and the steering stability while reducing the weight as well as a method of mounting the same onto a vehicle.

According to a first aspect of the invention, there is the provision of a pneumatic tire comprising at least one carcass ply containing textile cords with a tensile modulus of 20–1000 kgf/mm$^2$ arranged at a cord inclination angle of 30–90° with respect to an equatorial plane of the tire and a belt comprised of two cross belt layers containing textile cords with a tensile modulus of 50–2000 kgf/mm$^2$ arranged at a cord inclination angle of 10–45° with respect to the equatorial plane, in which the cord inclination angle of one of the two cross belt layers with respect to the equatorial plane is made larger by 5–35° than the cord inclination angle of the other remaining cross belt layer in the widthwise direction of the tire.

According to a second aspect of the invention, there is the provision of a method of mounting a pneumatic tire comprising at least one carcass ply containing textile cords with a tensile modulus of 20–1000 kgf/mm$^2$ arranged at a cord inclination angle of 30–90° with respect to an equatorial plane of the tire and a belt comprised of two cross belt layers containing textile cords with a tensile modulus of 50–2000 kgf/mm$^2$ arranged at a cord inclination angle of 10–45° with respect to the equatorial plane onto a four-wheeled vehicle, characterized in that a pneumatic tire as defined in the first aspect or having a difference of cord inclination angle between two cross belt layers within a range of 5–35° is mounted onto at least either left-side or right-side front wheel of the vehicle.

When the pneumatic tire defined in the first aspect of the invention is mounted onto at least either left-side or right-side front wheel, the cornering performance is increased at the side mounted with the above tire along a direction of the belt cord having a larger cord inclination angle with respect to the equatorial plane in the widthwise direction.

For example, when the cords in a second belt layer are inclined by not less than 5° but not more than 35° than the cords in a first belt layer with respect to the equatorial plane of the tire in the widthwise direction thereof, the cornering performance is increased in the cord inclination direction of the second belt layer.

Similarly, when the cords in a first belt layer are inclined by not less than 5° but not more than 35° than the cords in a second belt layer with respect to the equatorial plane in the widthwise direction, the cornering performance is increased in the cord inclination direction of the first belt layer.

In this case, tires having the two cross belt layers in which the difference in cord inclination angle between the two cross belt layers is zero are applicable to the remaining three wheels of the vehicle.

When a slip angle (an angle between a running direction of the vehicle and a slanting direction of a tire at a state viewing from upper side, which is abbreviated as SA hereinafter) is applied to the running tire, a cornering force (abbreviated as CF hereinafter) is generated as a cornering force of the tire.

It has been confirmed that the CF largely changes when the cord inclination angle of one of the two cross belt layers with respect to the equatorial plane of the tire is made larger by a range of 5–35° than that of the other belt layer in the widthwise direction of the tire. Moreover, when the difference in the cord inclination angle is less than 5°, the change of CF is slight.

As shown in FIGS. 6a and 6b, CF characteristic curve in a comparative tire (the difference in cord inclination angle between first and second belt layers with respect to the equatorial plane is zero) is substantially the same even if SA of the tire is changed in left and right sides.

On the contrary, in an invention tire (the cord inclination angle of the second belt layer with respect to the equatorial plane of the tire is made larger by a range of 5–35° than that of the first belt layer in the widthwise direction). It has been confirmed that when the cord inclination direction of the second belt layer is the same as the direction of SA, CF (maximm value) is fairly raised as compared with that of the comparative tire. When the cord inclination direction of the second belt layer is opposite to the direction of SA, CF (maximum value) is fairly fallen down as compared with that of the comparative tire.

Similarly, it has been confirmed that even if the cord inclination angle of the first belt layer with respect to the equatorial plane of the tire is made larger by a range of 5–35° than that of the second belt layer in the widthwise direction, when the cord inclination direction of the first belt layer is the same as the direction of SA, CF (maximum value) is fairly raised as compared with that of the comparative tire, while when the cord inclination direction of the first belt layer is opposite to the direction of SA, CF (maximum value) is fairly fallen down as compared with that of the comparative tire.

That is, it has been found that CF is raised up in the cord inclination direction of a belt layer having a cord inclination angle larger by a range of 5–35° than that of another belt layer among the first and second belt layers in the widthwise direction.

Moreover, the difference in the cord inclination angle between the first and second belt layers is preferably within a range of 10–20° because the difference in CF characteristic at left and right SA sides become more conspicuous.

The invention is based on the knowledge of the above difference in CF characteristic.

In a preferable embodiment of the second aspect of the invention, the tire defined in the first aspect is mounted onto each of the left-side and right-side front wheels of the vehicle, in which the cord inclination direction of the belt layer having a larger cord inclination angle in the widthwise direction is the same in the left-side and right-side front wheels.

According to such a mounting method, the cornering performance is further increased along the cord inclination direction of the belt layer having a larger cord inclination angle in the widthwise direction.

In another preferable embodiment, as shown in FIG. 2, the tire defined in the first aspect is mounted onto each of the left-side and right-side front and rear wheels of the vehicle, in which the cord inclination direction of the belt layer a having a larger cord inclination angle in the widthwise direction is the same in the left-side and right-side rear wheels and in the front and rear wheels.

According to such a mounting method, the cornering performance is further increased along the cord inclination direction of the belt layer a having a larger cord inclination angle in the widthwise direction. This is suitable for running on a circuit course substantially like an oval course.

In the other preferable embodiment, as shown in FIG. 5, the tire defined in the first aspect is mounted onto each of the left-side and right-side front and rear wheels of the vehicle, in which the cord inclination direction of the belt layer a having a larger cord inclination angle in the widthwise direction is the same in the left-side and right-side rear wheels but is opposite to the front and rear wheels.

According to such a mounting method, the self-rotating property regarding a center of the vehicle as a central axis is promoted. Therefore, the cornering performance is further increased along the cord inclination direction of the belt layer a having a larger cord inclination angle in the widthwise direction in the tire mounted on the front wheel. This is suitable for running on a circuit course substantially like an oval course.

In a still further preferable embodiment, the tire defined in the first aspect is mounted onto each of the left-side and right-side front wheels of the vehicle, in which the cord inclination direction of the belt layer a having a larger cord inclination angle in the widthwise direction is a direction of approaching to each other toward the forward running direction of the tire in the left-side and right-side front wheels (see FIGS. 3 and 4).

According to such a mounting method, the cornering performance is equally increased in the left-side and right-side directions. This is suitable for running on a general-purpose public road.

In another preferable embodiment, the tire defined in the first aspect is further mounted onto each of the left-side and right-side rear wheels of the vehicle, in which the cord inclination direction of the belt layer a having a larger cord inclination angle in the widthwise direction is a direction of approaching to each other toward the forward running direction of the tire in the left-side and right-side rear wheels (see FIG. 3).

According to such a mounting method, the cornering performance is more equally increased in the left-side and right-side directions. This is suitable for running on a general-purpose public road.

In the other preferable embodiment, the tire defined in the first aspect is further mounted onto each of the left-side and right-side rear wheels of the vehicle, in which the cord inclination direction of the belt layer a having a larger cord inclination angle in the widthwise direction is a direction of separating away from each other toward the forward running direction of the tire in the left-side and right-side rear wheels (see FIG. 4).

According to such a mounting method, the cornering performance is equally increased in the left-side and right-side directions. And also, the self-rotating property is equally increased. This is suitable for running on a general-purpose public road and a circuit course.

In a still further preferable embodiment, the tire defined in the first aspect is mounted onto each of the left-side and right-side front and rear wheels of the vehicle, in which the cord inclination direction of the belt layer a having a larger cord inclination angle in the widthwise direction is a direction of separating away from each other toward the forward running direction of the tire in the left-side and right-side front wheels and the cord inclination direction of the belt layer a having a larger cord inclination angle in the widthwise direction is in a direction approaching to each other toward the forward running direction of the tire in the left-side and right-side rear wheels.

Such a mounting method brings about the improvement of the steering property in a vehicle having an over-steer characteristic.

As a raw material used in the textile cord for the carcass ply of the tire according to the invention, there are mentioned rayon, nylon (6-nylon, 66-nylon), polycarbonate, polyolefin, polyester, PET (polyethylene terephthalate), PEN (polyethylene naphthalate), aromatic polyamide (KEVLAR), trade name of DuPont) and the like.

As a raw material used in the textile cord for the belt layer, there are mentioned rayon, nylon (6-nylon, 66-nylon), polycarbonate, polyolefin, polyester, PET (polyethylene terephthalate), PEN (polyethylene naphthalate), aromatic polyamide (KEVLAR), trade name of DuPont), glass fiber, carbon fiber and the like.

BRIEF DESCRIPTION OF THE DRAWINGS

FIG. 4 is a schematically plane view of a third embodiment of mounting tires onto a four-wheeled vehicle according to the invention;

FIG. 5 is a schematically plane view of a fourth embodiment of mounting tires onto a four-wheeled vehicle according to the invention.

DESCRIPTION OF PREFERRED EMBODIMENTS

Figure 1:
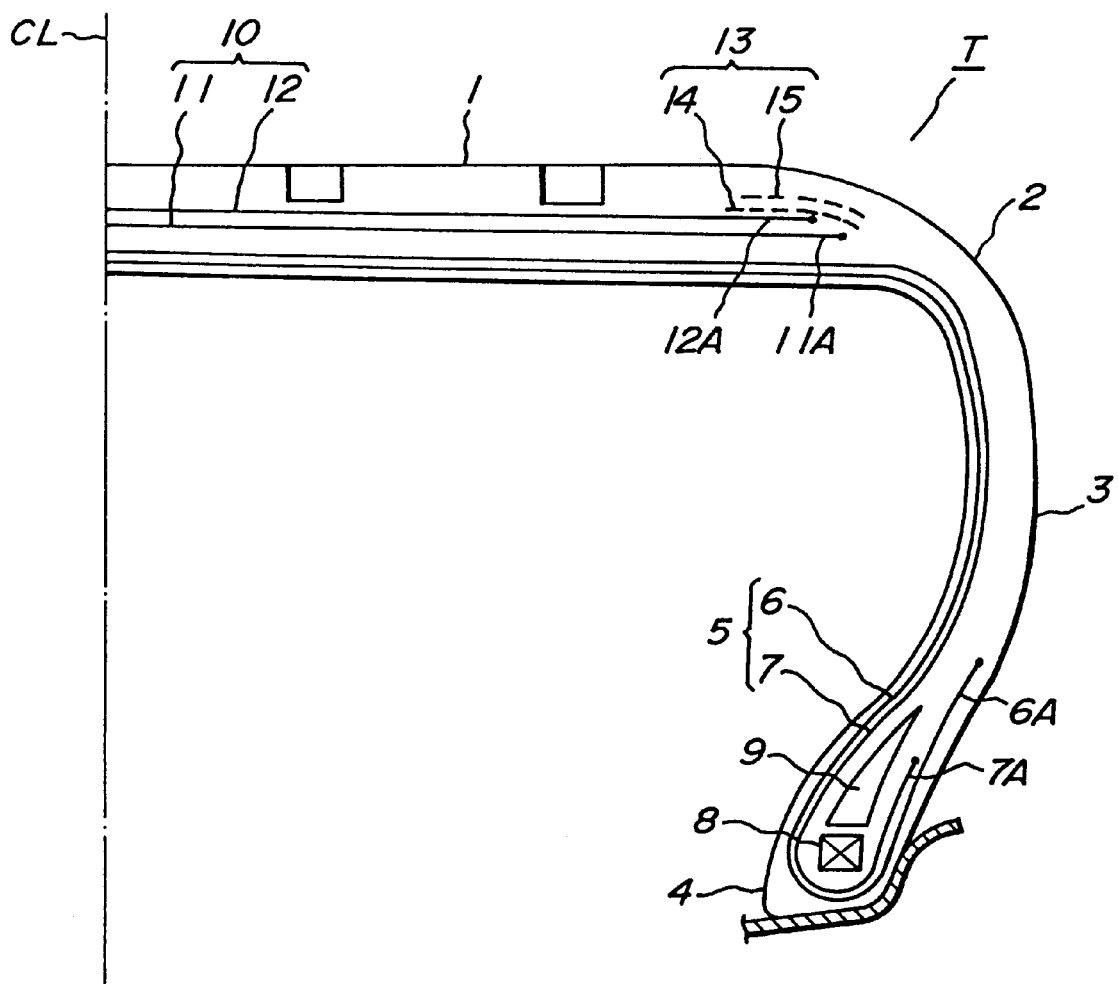
FIG. 1 is a right-half radial section view of an embodiment of the tire according to the invention.

In FIG. 1 is shown a right-half radial section view of a tire according to the invention, wherein symbol T is a tire, reference numeral 1 a tread portion, reference numeral 2 a shoulder portion, reference numeral 3 a side portion, and reference numeral 4 a bead portion.

A carcass 5 is comprised of two carcass plies 6 and 7, each extending from an inside of the tread portion 1 in the radial direction through the shoulder portion 2 and the side portion 3 to the bead portion 4 and further being wound around a bead core 8 and a filler 9 in the bead portion 4 from inside toward outside to form a turnup end portion 6A, 7A. Moreover, the carcass 5 may be comprised of only one ply, or may adopt an up-down structure.

A belt 10 is superimposed about the carcass 5 in the radial direction and comprised of two first and second belt layers 11 and 12, cords of which layers are crossed with each other. The second belt layer 12 is located outside the first belt layer 11 in the radial direction to form an outermost layer of the belt.

A reinforcing layer 13 comprised of two layer plies 14, 15 is arranged on the outside of the belt 10 in the radial direction so as to cover end portions 11A, 12A of the belt layers 11, 12.

EXAMPLE

There are provided a Comparative Tire, Invention Tires 1 and 2 and a conventional tire each having a tire size of 225/50R16. In each of these tires, structures of the carcass and belt are shown in Table 1. With respect to each of these tires, maximum values of CF produced in left turning (occurrence of left SA) and right turning (occurrence of right SA) are measured by means of a CF measuring test machine. And also, each of these tires is run at a high speed on a drum testing machine to measure a running distance until the tire is broken, whereby the high-speed durability is evaluated. The measured values are represented by an index on the basis that the comparative tire is 100 and also shown in Table 1.

TABLE 1

|  | Comparative tire | Invention tire 1 | Invention tire 2 | Conventional tire |
|---|---|---|---|---|
| Carcass cord | two plies nylon 1260d/2 | two plies nylon 1260d/2 | two plies nylon 1260d/2 | two plies nylon 1260d/2 |
| cord angle | 0° | 0° | 0° | 0° |
| Belt cord | two cross layers aramid 1500d/2 | two cross layers aramid 1500d/2 | two cross layers aramid 1500d/2 | two cross layers steel |
| cord angle |  |  |  |  |
| first belt layer | 25° upward to the left | 20° upward to the left | 20° upward to the right | 25° upward to the left |
| second belt layer | 25° upward to the right | 30° upward to the right | 30° upward to the left | 25° upward to the right |
| Angle difference | 0° | 10° | 10° | 0° |
| CF max |  |  |  |  |
| left SA | 100 | 95 | 105 | 105 |
| right SA | 100 | 105 | 95 | 105 |
| High-speed durability | 100 | 105 | 105 | 90 |

Then, each of the Comparative Tire and the Invention tires 1 and 2 is mounted onto a test vehicle to evaluate the steering stability in the cornering and the cornering characteristic. Moreover, the mounting method of the tire is shown in Table 2. The Mounting Examples 1–4 are according to the method of the invention.

TABLE 2

Figure 2:
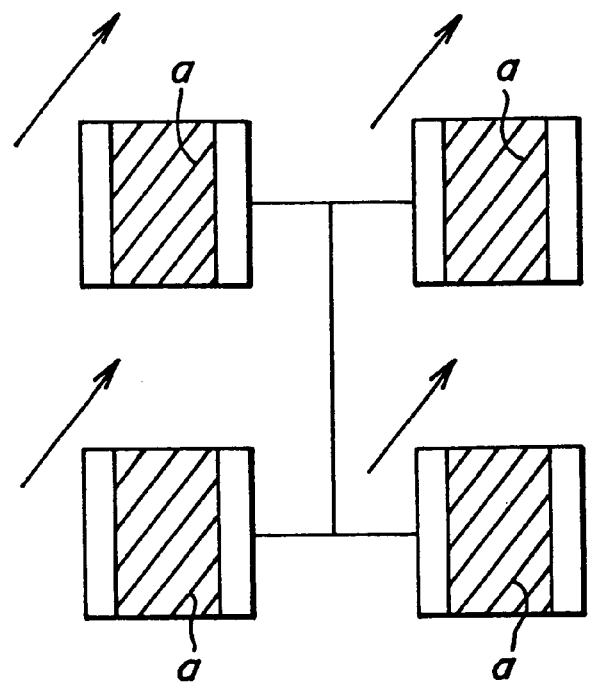
FIG. 2 is a schematically plane view of a first embodiment of mounting tires onto a four-wheeled vehicle according to the invention.
Figure 3:
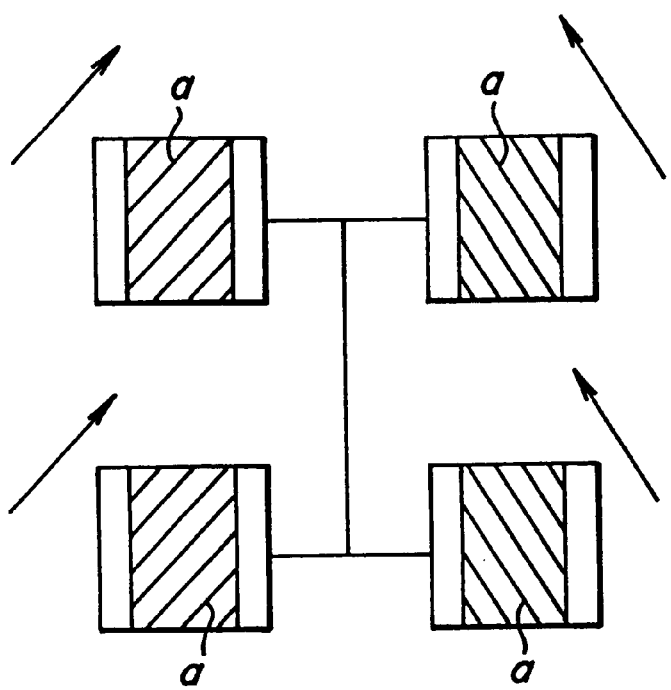
FIG. 3 is a schematically plane view of a second embodiment of mounting tires onto a four-wheeled vehicle according to the invention.
Figure 6A:
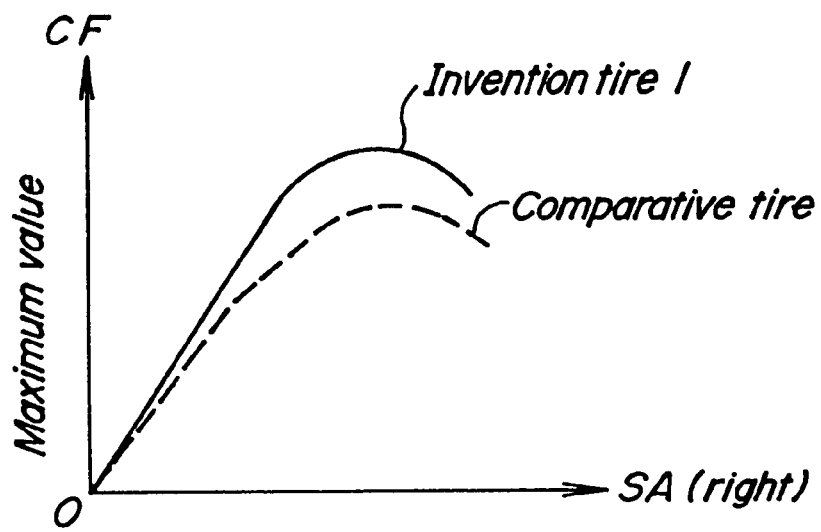
FIGS. 6a and 6b are graphs showing CF characteristics of invention tire and comparative tire, respectively.
Figure 6B:
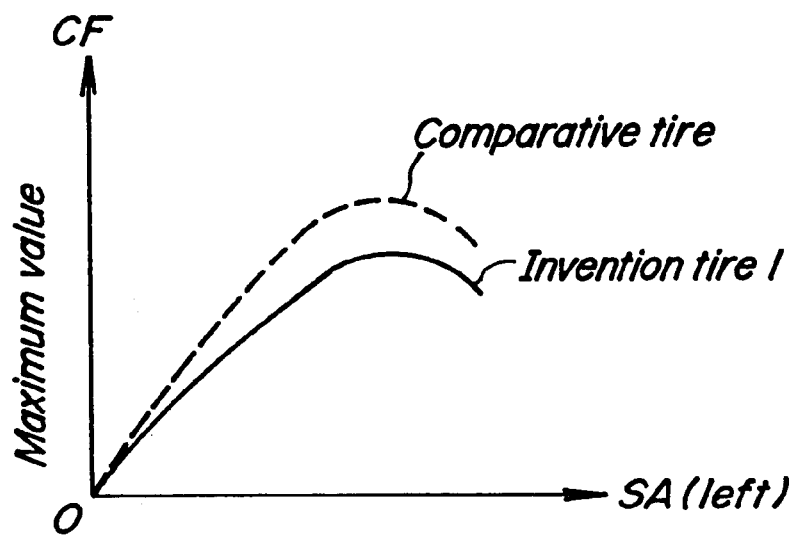

|  | Comparative mounting example | Mounting Example 1 | Mounting Example 2 | Mounting Example 3 | Mounting Example 4 |
|---|---|---|---|---|---|
| Front wheel side |  |  |  |  |  |
| left | Comparative tire | Invention tire 1 | Invention tire 1 | Invention tire 1 | Invention tire 1 |
| right | Comparative tire | Invention tire 1 | Invention tire 2 | Invention tire 2 | Invention tire 1 |
| Rear wheel side |  |  |  |  |  |
| left | Comparative tire | Invention tire 1 | Invention tire 1 | Invention tire 2 | Invention tire 2 |
| right | Comparative tire | Invention tire 1 | Invention tire 2 | Invention tire 1 | Invention tire 2 |
| Relevant figure | — | FIG. 2 | FIG. 3 | FIG. 4 | FIG. 5 |
| Steering stability |  |  |  |  |  |
| left cornering | 100 | 90 | 105 | 103 | 90 |
| right cornering | 100 | 105 | 105 | 103 | 105 |
| Cornering characteristic |  |  |  |  |  |
| left cornering | neutral-steer | under-steer | neutral-steer | over-steer | under-steer |
| right cornering | neutral-steer | neutral-steer | neutral-steer | over-steer | over-steer |
| Favorable running embodiment | running on general-purpose public road | running at one-way cornering (oval course) | running on general-purpose public road | running at left and right cornering | running at one-way cornering (oval course) |

As seen from Table 1, the high-speed durability is improved in the Invention Tires 1 and 2. As seen from Table 2, the steering stability is improved in the cornering along the cord inclination direction of the belt layer having a larger cord angle in the radial direction in the mounting Examples 1 and 4, while the steering stability is improved in both the left cornering and the right cornering in the mounting Examples 2 and 3.

As mentioned above, according to the invention, the effect of improving the steering stability of the tire is developed while improving the high-speed durability.

What is claimed is:

1. A set of two front tires and two rear tires for a four-wheeled vehicle, each of the front tires comprising at least one carcass ply containing textile cords with a tensile modulus of 20–1000 kgf/mm$^2$ arranged at a cord inclination angle of 30–90° with respect to an equatorial plane of the tire and a belt comprised of two cross belt layers containing textile cords with a tensile modulus of 50–2000 kgf/mm$^2$ arranged at a cord inclination angle of 10–45° with respect to the equatorial plane, in which the cord inclination angle of one of the two cross belt layers with respect to the equatorial plane is made larger by 5–35° than the cord inclination angle of the other remaining cross belt layer in the widthwise direction of the tire, and a cord inclination direction of the cross belt layer having a larger cord inclination angle in the widthwise direction is the same in left-side and right-side front wheels of the vehicle.

2. A set of tires according to claim 1, wherein the two front tires are mounted onto each of the left-side and right-side front wheels of the vehicle, the cord inclination angle of the cross belt layer having a larger cord inclination angle in the widthwise direction of each front tire is the same.

3. A set of tires according to claim 1, wherein for each tire a difference in cord inclination angle of cords in said two cross belt layers is within a range of 10–20°.

4. A set of tires according to claim 1, wherein said textile cords of said at least one carcass ply are made of a material selected from the group consisting of rayon, 6-nylon, 66nylon, polycarbonate, polyolefin, polyester, polyethylene terephthalate, polyethylene naphthalate, aromatic polyamide, glass fiber and carbon fiber.

5. A set of tires according to claim 1, wherein said textile cords of said cross belt layers are made of a material selected from the group consisting of rayon, 6-nylon, 66-nylon, polycarbonate, polyolefin, polyester, polyethylene terephthalate, polyethylene naphthalate, aromatic polyamide, glass fiber and carbon fiber.

6. A set of two front tires and two rear tires for a four-wheeled vehicle, each of which tires comprising at least one carcass ply containing textile cords with a tensile modulus of 20–1000 kgf/mm$^2$ arranged at a cord inclination angle of 30–90° with respect to an equatorial plane of the tire and a belt comprised of two cross belt layers containing textile cords with a tensile modulus of 50–2000 kgf/mm$^2$ arranged at a cord inclination angle of 10–45° with respect to the equatorial plane, in which the cord inclination angle of one of the two cross belt layers with respect to the equatorial plane is made larger by 5–35° than the cord inclination angle of the other remaining cross belt layer in the widthwise direction of the tire, and a cord inclination direction of the cross belt layer having a larger cord inclination angle in the widthwise direction is the same in left-side and right-side front and rear wheels of the vehicle.

7. A set of two front tires and two rear tires for a four-wheeled vehicle, each of which tires comprising at least one carcass ply containing textile cords with a tensile modulus of 20–1000 kgf/mm$^2$ arranged at a cord inclination angle of 30–90° with respect to an equatorial plane of the tire and a belt comprised of two cross belt layers containing textile cords with a tensile modulus of 50–2000 kgf/mm$^2$ arranged at a cord inclination angle of 10–45° with respect to the equatorial plane, in which the cord inclination angle of one of the two cross belt layers with respect to the equatorial plane is made larger by 5–35° than the cord inclination angle of the other remaining cross belt layer in the widthwise direction of the tire, and a cord inclination direction of the cross belt layer having a larger cord inclination angle in the widthwise direction is the same in left-side and right-side front and rear wheels of the vehicle but is opposite in the front wheel and the rear wheel.

* * * * *